US012568034B2

(12) United States Patent
Hatta et al.

(10) Patent No.: US 12,568,034 B2
(45) Date of Patent: Mar. 3, 2026

(54) TRAFFIC MONITORING DEVICE AND TRAFFIC MONITORING PROGRAM

(71) Applicant: NTT, Inc., Tokyo (JP)

(72) Inventors: Saki Hatta, Tokyo (JP); Hiroyuki Uzawa, Tokyo (JP); Shuhei Yoshida, Tokyo (JP); Yusuke Sekihara, Tokyo (JP); Shoko Oteru, Tokyo (JP); Yuko Iinuma, Tokyo (JP); Namiko Ikeda, Tokyo (JP)

(73) Assignee: NTT, INC., Tokyo (JP)

( * ) Notice: Subject to any disclaimer, the term of this patent is extended or adjusted under 35 U.S.C. 154(b) by 6 days.

(21) Appl. No.: 18/696,905

(22) PCT Filed: Nov. 9, 2021

(86) PCT No.: PCT/JP2021/041180
§ 371 (c)(1),
(2) Date: Mar. 28, 2024

(87) PCT Pub. No.: WO2023/084599
PCT Pub. Date: May 19, 2023

(65) Prior Publication Data
US 2024/0406089 A1      Dec. 5, 2024

(51) Int. Cl.
*H04L 43/0894* (2022.01)
*H04L 43/0823* (2022.01)

(52) U.S. Cl.
CPC ...... *H04L 43/0894* (2013.01); *H04L 43/0823* (2013.01)

(58) Field of Classification Search
CPC ............. H04L 43/0894; H04L 43/0823; H04L 43/026; H04L 43/16
See application file for complete search history.

(56) References Cited

U.S. PATENT DOCUMENTS

| 9,060,016 | B2 * | 6/2015 | Han | ..................... H04L 63/1416 |
| 10,003,515 | B1 * | 6/2018 | Whiteside | ............. H04L 43/026 |
| 11,929,869 | B2 * | 3/2024 | Gonigberg | ............ G06F 9/4411 |
| 11,947,507 | B2 * | 4/2024 | Uzawa | .................. H04L 43/026 |

(Continued)

FOREIGN PATENT DOCUMENTS

| JP | 2018142197 A | 9/2018 |
| WO | 2020230265 A1 | 11/2020 |

OTHER PUBLICATIONS

JP-2018142197-A; Oki Electric Ind. Co Ltd; English Translation (Year: 2018).*

(Continued)

*Primary Examiner* — Jerry B Dennison
(74) *Attorney, Agent, or Firm* — Slater Matsil, LLP

(57) ABSTRACT

An embodiment is a traffic monitoring device configured to acquire traffic statistical information of a flow in the monitoring target network, determine whether the acquired traffic statistical information satisfies a predetermined reference for failure detection, capture packets of the flow determined to satisfy the predetermined reference as packets at the time of failure occurrence in the flow, and dynamically update the predetermined reference while the device is still acquiring traffic statistical information of the flow in the monitoring target network.

18 Claims, 9 Drawing Sheets

(56) References Cited

U.S. PATENT DOCUMENTS

2001/0021176 A1*  9/2001  Mimura ................ H04L 43/065
                                                    370/235
2008/0195732 A1*  8/2008  Maruyama .......... H04L 63/1458
                                                    709/224
2022/0217069 A1*  7/2022  Yoshida .............. H04L 43/0882
2023/0246928 A1*  8/2023  Cociglio ............ H04L 43/0817
                                                    709/224
2024/0275700 A1*  8/2024  Hatta ................... H04L 43/026

OTHER PUBLICATIONS

WO 2020230265-A1; Yoshida et al.; English Translation (Year: 2020).*
Bijikomi Co., Ltd., "Virtual network monitoring system with packet capture function using Hardware Accelerator (HWA)," Business Communication, vol. 58, No. 5, 2021.

* cited by examiner

TRAFFIC MONITORING DEVICE AND TRAFFIC MONITORING PROGRAM

CROSS-REFERENCE TO RELATED APPLICATIONS

This application is a national phase entry of PCT Application No. PCT/JP2021/041180, filed on Nov. 9, 2021, which application is hereby incorporated herein by reference.

TECHNICAL FIELD

The present invention relates to technology for monitoring traffic in a network.

BACKGROUND

A traffic monitoring device is known that can monitor traffic statistical information (traffic volume and the like) of a flow (aggregate of packets in which rules specified from a transmission source or destination such as a MAC address or IP address are the same) in real time, and capture a packet of the flow and determine a cause at the time of failure occurrence. For example, with the progress of virtualization technology in network functions virtualization (NFV)/software defined networking (SDN), the device is used for services using a virtual machine (VM) and the like.

In a case where the traffic volume of a specific flow rapidly increases, it is desirable to be able to capture packets of a target flow immediately after the rapid increase in order to specify the cause, and a method of designating a flow and starting capture has been proposed (Non Patent Literature 1). In this method, the traffic volume is compared with a threshold value, and the failure occurrence is reported.

CITATION LIST

Non Patent Literature

Non Patent Literature 1: "Hardware Accelerator (HWA) wo mochiita packet capture kinou tousai kasou network kanshi system (in Japanese) (Virtual Network Monitoring System with Packet Capture Function Using a Hardware Accelerator (HWA))" Business Communication 2021 vol. 58 No. 5

SUMMARY

Technical Problem

The traffic volume varies according to the time period even when a traffic volume is normal. For example, the traffic volume may increase in the evening. However, in the technology of Non Patent Literature 1, since the threshold value is fixed, it is not possible to respond to a normal variation in the traffic volume, and erroneous detection of a failure or non-detection of a failure occurs.

An object of the present invention is to accurately capture packets at the time of failure occurrence.

Solution to Problem

In order to solve the above problem, according to embodiments of the present invention, there is provided a traffic monitoring device that monitors traffic of a monitoring target network, the traffic monitoring device including: an information processing unit configured to acquire traffic statistical information of a flow in the monitoring target network and determine whether the acquired traffic statistical information satisfies a predetermined reference for failure detection; and a packet capture unit configured to capture packets of the flow determined to satisfy the predetermined reference as packets at the time of failure occurrence in the flow, wherein the information processing unit is configured to dynamically update the predetermined reference while the information processing unit is in operation.

In order to solve the problem, according to embodiments of the present invention, there is provided a traffic monitoring program for causing a computer that monitors traffic of a monitoring target network to execute an information processing step of acquiring traffic statistical information of a flow in the monitoring target network and determining whether the acquired traffic statistical information satisfies a predetermined reference for failure detection, and a packet capture step of capturing packets of the flow determined to satisfy the predetermined reference as packets at the time of failure occurrence in the flow, in which the information processing step is a step of dynamically updating the predetermined reference while the information processing unit is in operation.

Advantageous Effects of Invention

According to the present invention, it is possible to accurately capture packets at the time of failure occurrence.

BRIEF DESCRIPTION OF THE DRAWINGS

FIG. 1 is a block diagram illustrating a configuration of a traffic monitoring device according to a first embodiment of the present invention.

FIG. 3 is a block diagram illustrating a configuration of a traffic monitoring device according to a second embodiment of the present invention.

DETAILED DESCRIPTION OF ILLUSTRATIVE EMBODIMENTS

Figure 2:
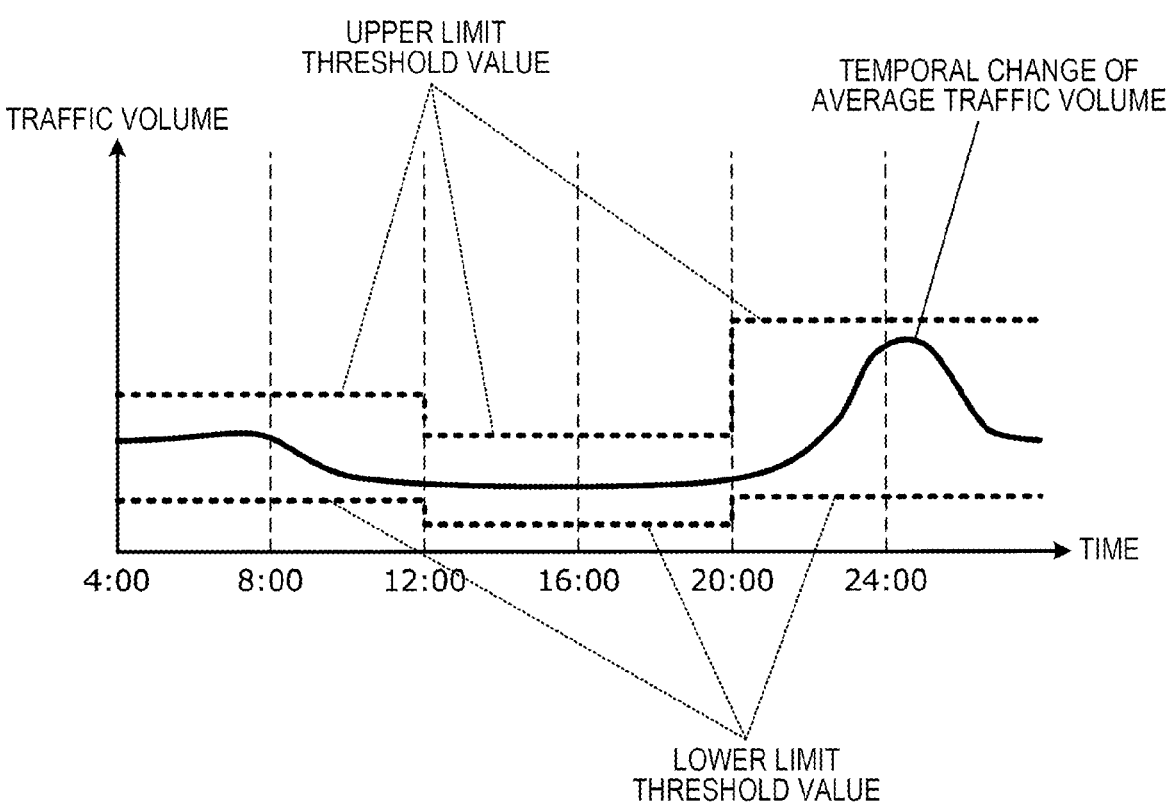
FIG. 2 is a graph for describing a change in a traffic volume, an upper limit threshold value, and a lower limit threshold value.

Hereinafter, embodiments of the present invention will be described in detail with reference to the drawings, but the present invention is not limited to the following embodiments.

First Embodiment

Figure 1:
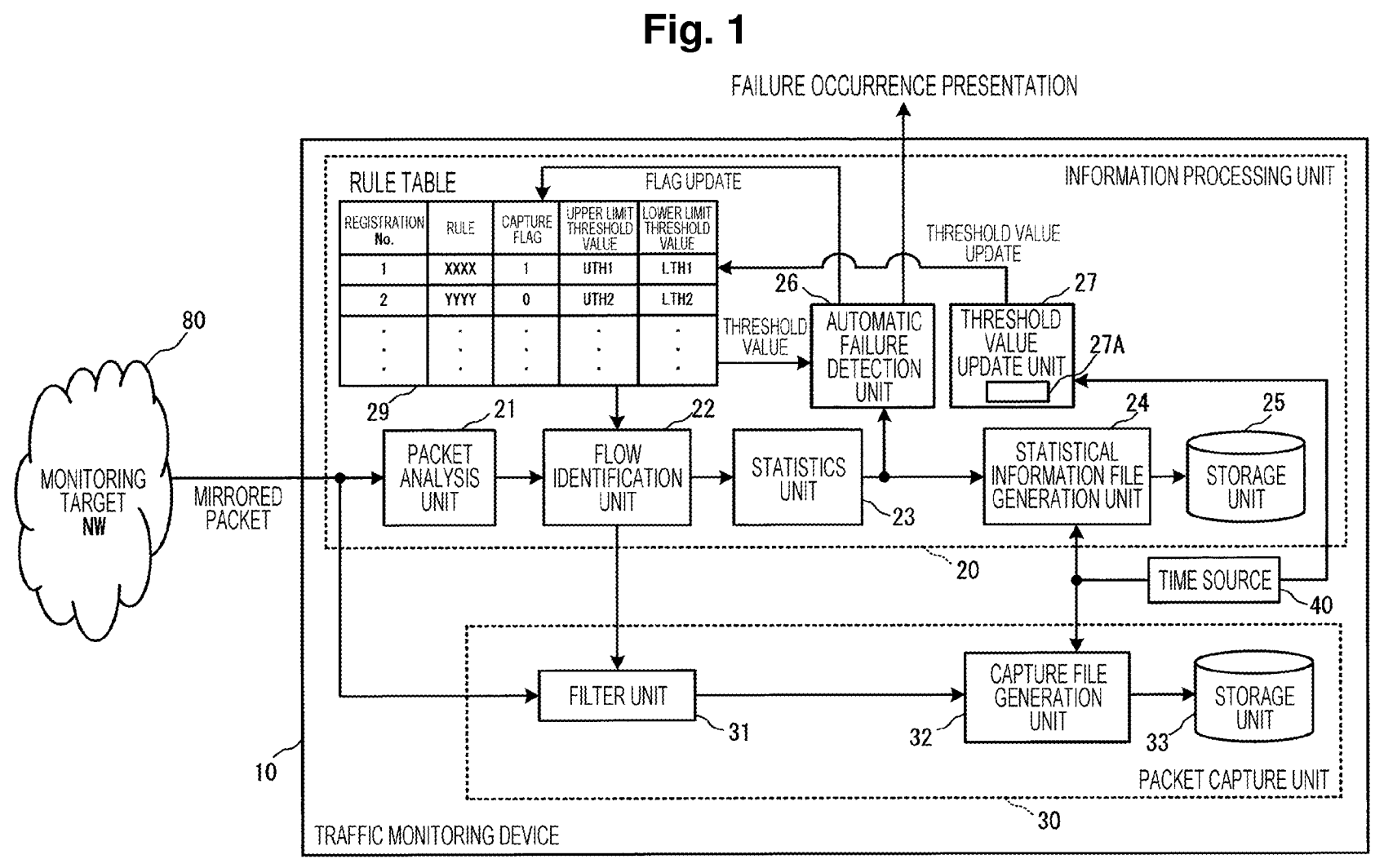

As illustrated in FIG. 1, mirrored packets, which are a copy of packets transmitted and received on a monitoring target network 80, is input to a traffic monitoring device 10 according to the first embodiment of the present invention as input packets. The traffic monitoring device 10 monitors traffic for each flow of the monitoring target network 80 based on the input packets. Here, the flow refers to a set of packets in which at least one of field values indicating a transmission source and a destination is the same.

As illustrated in FIG. 1, the traffic monitoring device 10 includes an information processing unit 20, a packet capture unit 30, and a time source 40. The input packet is input to both the information processing unit 20 and the packet capture unit 30. The traffic monitoring device 10 includes a computer or the like, and operates as the information processing unit 20 and the packet capture unit 30 when a processor such as a CPU of the computer executes a program. The time source 40 includes a real-time clock or the like.

The information processing unit 20 includes a packet analysis unit 21, a flow identification unit 22, a statistics unit 23, a statistical information file generation unit 24, a storage unit 25, an automatic failure detection unit 26, a threshold value update unit 27, and a rule table 29.

The packet analysis unit 21 analyzes input packets input from the monitoring target network 80. Through this analysis, the packet analysis unit 21 extracts header information necessary for identifying the flow of the input packet included in the input packet. The extracted header information is information that can be compared with a rule defined in the rule table 29 (to be described later) for matching or non-matching. Examples of the header information and rule include a transmission source/destination MAC address, a transmission source/destination IP address, a transmission source/destination port number, and a protocol type.

The flow identification unit 22 identifies the flow of the input packet based on the header extracted by the packet analysis unit 21. The flow identification unit 22 refers to the rule table 29 in which a rule corresponding to a flow is recorded. In the rule table 29, a registration number n of a flow, the above-described rule for identifying the flow, a capture flag indicating presence or absence of capture of packets of the flow, and an upper limit threshold value UTHn and a lower limit threshold value LTHn for determining whether or not a failure has occurred in the flow are stored in association with each other for each flow. Here, n is an integer of 1 to N, and N is the number of flows registered in the rule table 29 (hereinafter the same applies to n). The packet capture flag instructs capturing in a case of "1", and instructs not capturing in a case of "0". The flow identification unit 22 refers to the rule table 29 and acquires the registration number n and the value of the capture flag corresponding to the rule matching the information of the header. By acquiring the registration number n, the flow of the input packet is identified.

The flow identification unit 22 outputs the acquired value of the capture flag to the packet capture unit 30. Although the details will be described later, when the capture flag is "1", the packet capture unit 30 captures the corresponding input packet. Further, the flow identification unit 22 outputs the acquired registration number n to the statistics unit 23 together with the input packet. When the registration number n cannot be acquired by referring to the rule table 29, the flow identification unit 22 outputs the number of packets or the data volume (the number of bytes or the like) to the statistics unit 23 as an unregistered flow.

Based on the registration number n and the input packet from the flow identification unit 22, the statistics unit 23 counts the number of packets or the data volume (the number of bytes or the like) of the input packet for each registration number n, that is, for each flow. The statistics unit 23 performs counting each time the registration number n and the input packet are input from the flow identification unit 22. The statistics unit 23 obtains a traffic volume which is traffic statistical information indicating a traffic state of the flow by this counting. Here, the traffic volume is the number of packets or the data volume per unit time. The statistics unit 23 also counts the number of packets or the data volume (the number of bytes or the like) input as the unregistered flow in the same manner as described above.

The statistical information file generation unit 24 periodically acquires a traffic volume (traffic statistical information), which is a result of counting in the statistics unit 23, from the statistics unit 23 and records the traffic volume in the storage unit 25. The statistical information file generation unit 24 acquires the time at the time of recording from the time source 40, and saves the traffic volume stamped with the acquired time in the storage unit 25. The time-stamped traffic volume is saved for each registration number n. The traffic volume in which the time is stamped constitutes a statistical information file. The time change of the traffic volume for each flow is specified by the statistical information file.

The automatic failure detection unit 26 acquires the traffic volume and the registration number n corresponding to the traffic volume from the statistics unit 13. The automatic failure detection unit 16 refers to the rule table 29 and acquires an upper limit threshold value UTHn and a lower limit threshold value LTHn corresponding to the registration number n. The automatic failure detection unit 26 compares the acquired upper limit threshold value UTHn and lower limit threshold value LTHn with the traffic volume. When the traffic volume exceeds the upper limit threshold value UTHn or falls below the lower limit threshold value LTHn, the automatic failure detection unit 16 updates the capture flag corresponding to the acquired registration number n in the rule table 29 to "1". When the capture flag is already "1", the capture of the input packet to be described later is already started, and thus "1" is maintained. When the traffic volume does not exceed the upper limit threshold value UTHn and does not fall below the lower limit threshold value LTHn, the automatic failure detection unit 26 updates the capture flag corresponding to the registration number n in the rule table 29 to "0". When the capture flag is already "0", this state is maintained.

When the traffic volume exceeds the upper limit threshold value UTHn, the traffic volume is large. For example, the traffic volume is rapidly increasing. In such a case, there is a possibility that a failure such as an attack of sending a large number of mails in the flow or congestion on the server occurs. In addition, when the traffic volume exceeds the lower limit threshold value LTHn, the traffic volume is small. For example, the traffic volume is rapidly decreasing. In such a case, there is a possibility that a failure such as server down occurs in the flow.

When the traffic volume exceeds the upper limit threshold value UTHn or falls below the lower limit threshold value LTHn, the automatic failure detection unit 26 outputs information indicating these contents (including the contents that a failure has occurred) to an external device (such as a display device) and presents the information to the user.

The threshold value update unit 27 periodically updates the upper limit threshold value UTHn and the lower limit threshold value LTHn based on the time from the time source 40. The reason therefor will be described later.

The packet capture unit 30 includes a filter unit 31, a capture file generation unit 32, and a storage unit 33.

The filter unit 31 temporarily buffers the input packet input to the packet capture unit 30 and waits until the value of the capture flag is notified from the flow identification unit 22. The value of the capture flag is a value acquired and output by the flow identification unit 22 for the buffered input packet. When the value of the capture flag is "1", the filter unit 31 outputs the buffered input packet to the capture file generation unit 32 in the subsequent stage. When the value of the capture flag is "0", the filter unit 31 discards the buffered input packet without outputting the input packet to the capture file generation unit 32 in the subsequent stage. As a result, the input packet when the value of the capture flag is "1" is converted into a file. Note that, considering a case where the flow identification unit 22 has not been able to acquire the registration number n by referring to the rule table 29, in a case where the value of the capture flag is not notified from the flow identification unit 22 for a certain period of time, the buffered input packet may be discarded. As another example, when the flow identification unit 22 cannot acquire the registration number n by referring to the rule table 29, the flow identification unit 22 may notify "0" as the value of the capture flag.

The capture file generation unit 32 converts the capture data bundled for a plurality of packets into a file using the input packet from the filter unit 31 and the time at the time of input of the input packet from the time source 40, and saves the file in the storage unit 25. As a result, the input packet is captured. The capture is automatically performed according to the value of the capture flag. The capture file generation unit 32 may convert the input packet into a file for each flow based on a header or the like.

The flow identification unit 22 may output the registration number n acquired above to the filter unit 31, and in this case, when the value of the capture flag is "1", the filter unit 31 may also generate the registration number n in the capture file generation unit 32. The capture file generation unit 32 may convert the input packet into a capture file for each registration number, that is, for each flow.

As described above, the threshold value update unit 27 periodically updates the upper limit threshold value UTHn and the lower limit threshold value LTHn based on the time from the time source 40. The threshold value update unit 27 dynamically updates the upper limit threshold value UTHn and the lower limit threshold value LTHn while the information processing unit 20 is in operation. Here, it is considered that the traffic volume of the same flow does not greatly change between different dates in the same time period. Therefore, the threshold value update unit 27 of the present embodiment changes the upper limit threshold value UTHn and the lower limit threshold value LTHn by dividing the period by a predetermined period. FIG. 2 illustrates a setting example of the upper limit threshold value UTHn and the lower limit threshold value LTHn in the flow of the registration number n. The graph in FIG. 2 illustrates an average daily traffic volume in which no failure occurs in the flow of the registration number n. In the present embodiment, one day is divided into three time periods, and the upper limit threshold value UTHn and the lower limit threshold value LTHn are set for each of the time periods.

The threshold value update unit 27 includes, for example, a table 27A in which the upper limit threshold value UTHn and the lower limit threshold value LTHn corresponding to time are defined for each registration number n, that is, for each flow. When the time corresponding to the table is observed by the time source 40, the threshold value update unit 27 updates the upper limit threshold value UTHn and the lower limit threshold value LTHn corresponding to the registration number n of the rule table 29 to the upper limit threshold value UTHn and the lower limit threshold value LTHn associated with the time in the table 27A.

The time at which the upper limit threshold value UTHn and the lower limit threshold value LTHn are updated may be the same or different for each flow. In addition, the update timing may be shifted between the upper limit threshold value UTHn and the lower limit threshold value LTHn in the same flow.

The end instruction from the start of capturing the input packet, that is, the trigger for updating the value of packet capture in the rule table 29 to "0" may be an end instruction from the outside. In addition, as described above, the automatic failure detection unit may issue an end instruction by detecting that the traffic volume is equal to or less than the upper limit threshold value and is equal to or greater than the lower limit threshold value. Alternatively, the information processing unit 20 may be provided with a timer corresponding to the number of flows, capturing may be continued until the timer expires after the capture start instruction is issued, and an end instruction may be issued after the timer expires.

A method of determining the upper limit threshold value UTHn and the lower limit threshold value LTHn is any method. For example, the standard deviation σ may be calculated from an average traffic volume of flows to be subjected to these threshold values over several days, and the upper limit threshold value UTHn=2σ and the lower limit threshold value LTHn=−2σ may be set. Depending on the application, the lower limit threshold value may be loosened to set −3σ or the like. In addition, the average value±constant value may be set as the upper limit threshold value UTHn and the lower limit threshold value LTHn with reference to the average value of the traffic volume at each timing in several days.

As illustrated in FIG. 2, the traffic volume varies according to the time period of a day even when the traffic volume is normal. When the upper limit threshold value and the lower limit threshold value are fixed, it is not possible to respond to the variation in the traffic volume in one day, and erroneous detection of a failure or non-detection of a failure occurs. As in the present embodiment, by changing the upper limit threshold value and the lower limit threshold value according to time, abnormal traffic can be detected by an appropriate threshold value according to the daily traffic variation, and only input packets that are really necessary can be captured as packets at the time of failure occurrence while preventing the occurrence of capture of unnecessary input packets. As a result, packet capture at the time of failure occurrence is accurately performed. Furthermore, in the present embodiment, since the lower limit threshold value is also set, it is possible to detect a failure in which the traffic volume has abnormally decreased.

Second Embodiment

In the first embodiment, the configuration in which the upper limit threshold value UTHn and the lower limit threshold value LTHn are changed in conjunction with the time has been described. In the second embodiment, the upper limit threshold value UTHn and the lower limit threshold value LTHn are finely changed in accordance with the current traffic volume.

Figure 3:
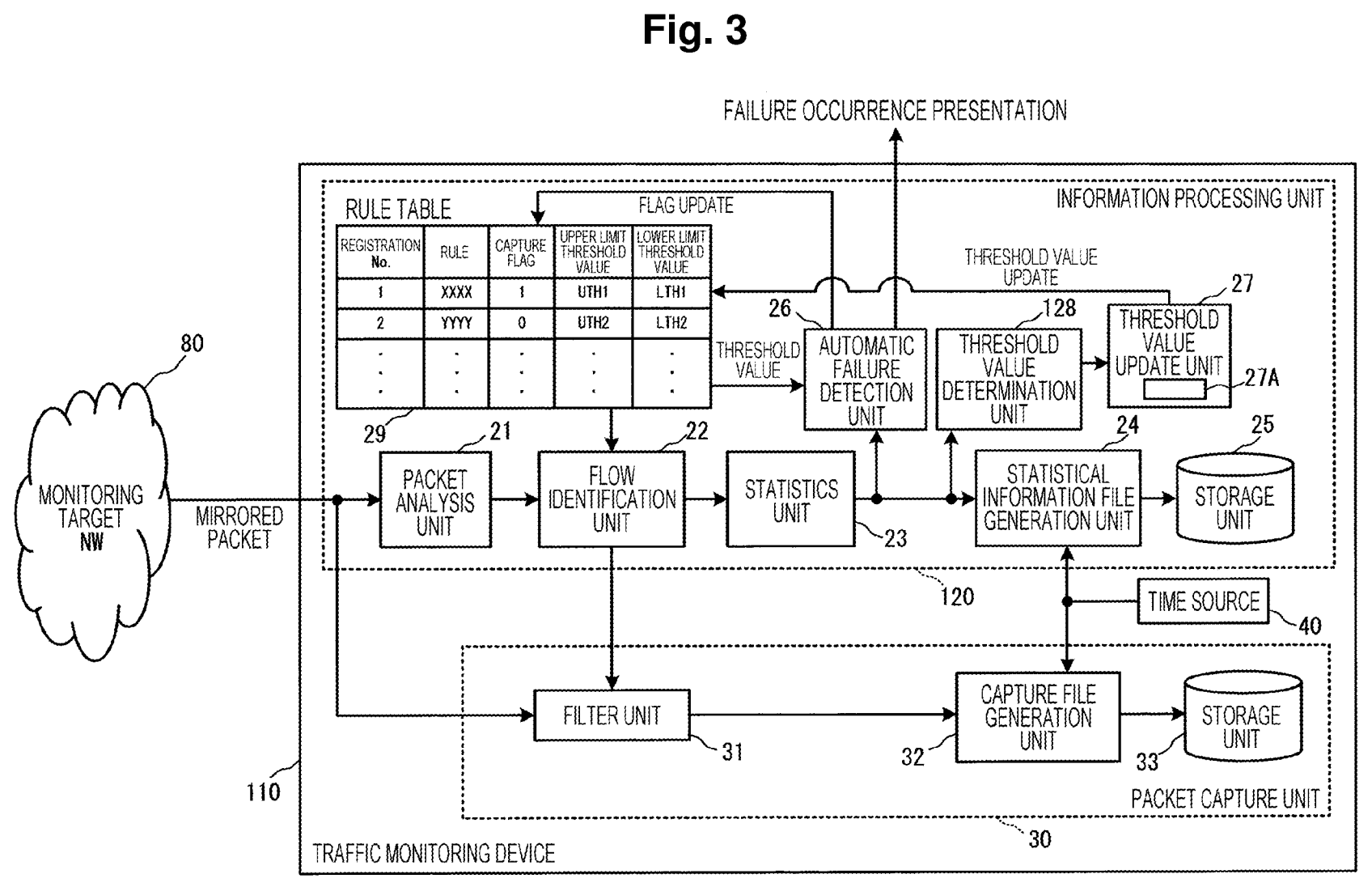

As illustrated in FIG. 3, the traffic monitoring device 110 according to the second embodiment includes an information processing unit 120 instead of the information processing unit 20 as compared with the traffic monitoring device 10 according to the first embodiment. The information processing unit 120 further includes a threshold value determination unit 128 in addition to the configuration of the information processing unit 20. The threshold value determination unit 128 determines the upper limit threshold value UTHn and the lower limit threshold value LTHn in real time based on the traffic volume for each flow of the registration number n, that is, for each registration number n.

The threshold value determination unit 128 calculates the upper limit threshold value UTHn and the lower limit threshold value LTHn for each predetermined threshold value update cycle, and notifies the threshold value update unit 27 of the calculation result. Upon receiving the notification, the threshold value update unit 27 updates the upper limit threshold value UTHn and the lower limit threshold value LTHn for each rule in the rule table 29. The threshold value determination unit 128 acquires the traffic volume and the registration number n corresponding to the traffic volume from the statistics unit 13, and based on these, calculates the upper limit threshold value UTHn and the lower limit threshold value LTHn for each flow, that is, for each registration number n.

The threshold value update cycle is a short cycle of 10 seconds or more and 10 minutes or less. Therefore, the upper limit threshold value UTHn and the lower limit threshold value LTHn are finely changed in short cycles. As a result, it is possible to set the upper limit threshold value UTHn and the lower limit threshold value LTHn according to the traffic volume updated in real time, and it is possible to improve the accuracy of packet capture execution by abnormal traffic trigger.

Here, an example of determining the upper limit threshold value UTHn and the lower limit threshold value LTHn will be described with reference to FIGS. 4 to 6. The threshold value determination unit 128 executes threshold value determination processing in FIG. 4. The following calculation, that is, the determination of the upper limit threshold value UTHn and the lower limit threshold value LTHn is performed for each registration number n, that is, each flow. It is assumed that a value necessary for the following calculation is calculated by the threshold value determination unit 128 based on the traffic volume of the statistical information file recorded in the storage unit 25. In addition, the threshold value determination unit 128 may hold a value or the like necessary for determining the upper limit threshold value UTHn and the lower limit threshold value LTHn.

The threshold value determination unit 128 first calculates the upper limit threshold value UTHn and the lower limit threshold value LTHn of the next cycle as temporary values by any of the following calculation methods (1) to (3) (step S11). Which one of the following calculation methods is adopted can be set by the user.

Figure 5:
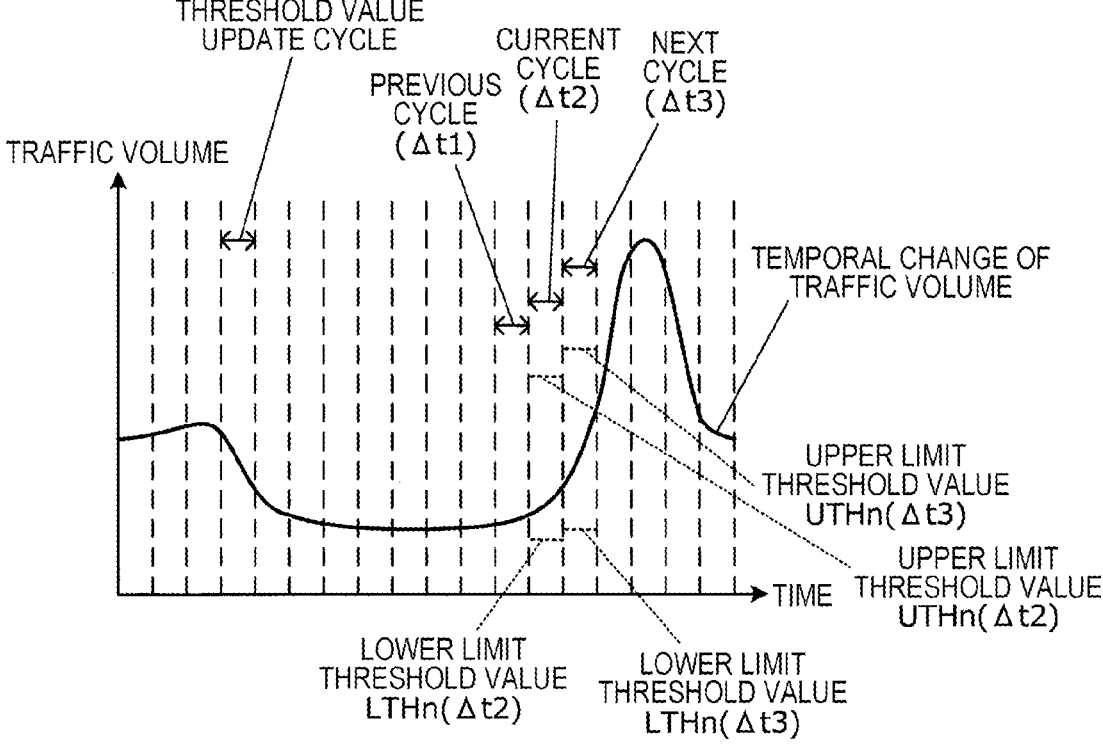
FIG. 5 is a diagram for describing a method of calculating an upper limit threshold value and a lower limit threshold value.

(1) The upper limit threshold value UTHn($\Delta$t3) and the lower limit threshold value LTHn($\Delta$t3) of the next cycle ($\Delta$t3) are calculated based on an average traffic volume Tave n($\Delta$t1) of the previous cycle ($\Delta$t1), an average traffic volume Tave n($\Delta$t2) of the current cycle ($\Delta$t2), and an upper limit threshold value UTHn($\Delta$t2) and a lower limit threshold value LTHn($\Delta$t2) of the current cycle ($\Delta$t2) (refer to FIG. 5 for each value). The calculation formula is, for example, the following formula.

$$UTHn(\Delta t3) = (Tave\ n(\Delta t2)/Tave\ n(\Delta t1)) \times UTHn(\Delta t2) \quad \text{(Formula 1)}$$

$$LTHn(\Delta t3) = (Tave\ n(\Delta t2)/Tave\ n(\Delta t1)) \times LTHn(\Delta t2) \quad \text{(Formula 2)}$$

Figure 6:
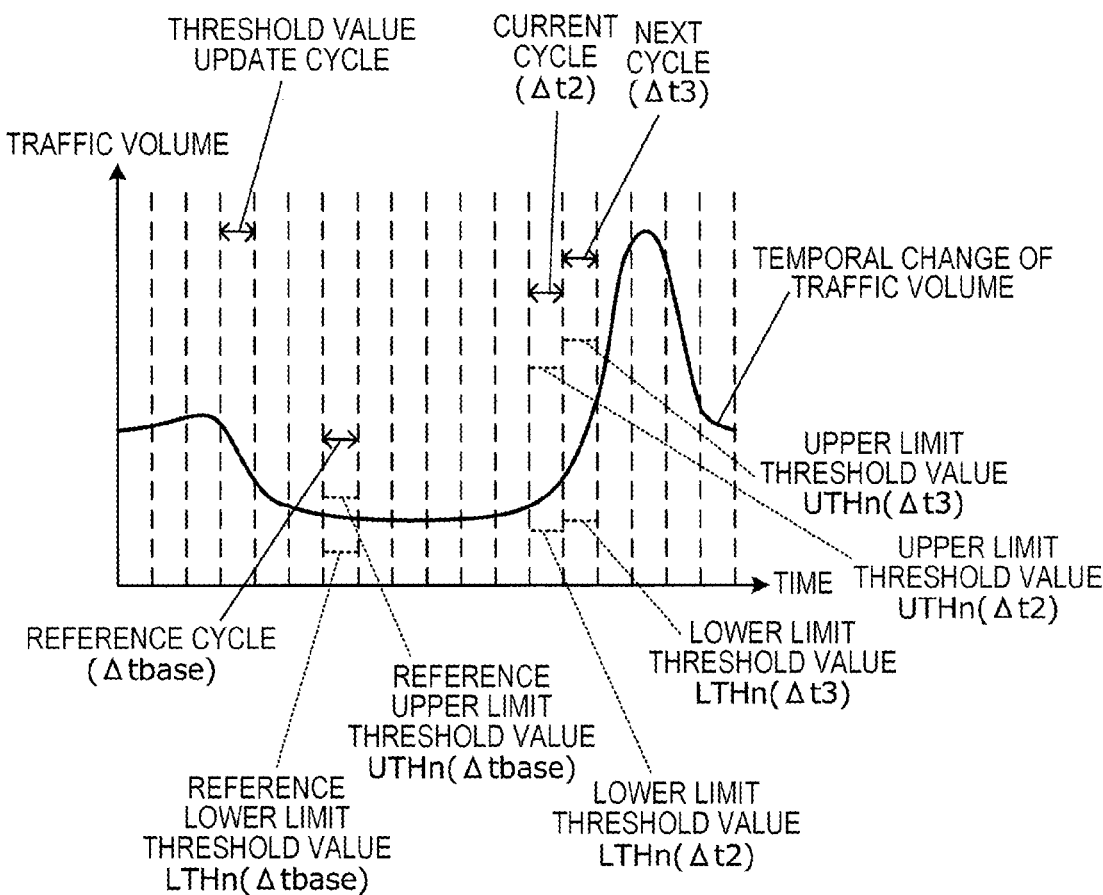
FIG. 6 is a diagram for describing a method of calculating an upper limit threshold value and a lower limit threshold value.

(2) The upper limit threshold value UTHn($\Delta$t3) and the lower limit threshold value LTHn($\Delta$t3) of the next cycle ($\Delta$t3) are calculated based on an average traffic volume Tave n($\Delta$tbase) of the reference cycle ($\Delta$tbase) which is a reference of the threshold value update cycle, an average traffic volume Tave n($\Delta$t2) of the current cycle ($\Delta$t2), and a reference upper limit threshold value UTHn($\Delta$tbase) and a reference lower limit threshold value LTHn($\Delta$tbase) of the reference cycle ($\Delta$tbase) (refer to FIG. 6 for each value). The calculation formula is, for example, the following formula. It is assumed that the average traffic volume Tave n($\Delta$tbase), the reference upper limit threshold value UTHn($\Delta$tbase), and the reference lower limit threshold value LTHn ($\Delta$tbase) are calculated and set in advance by any method. The above formula is, for example, the following formula. The reference cycle ($\Delta$tbase) is determined randomly.

$$UTHn(\Delta t3) = (Tave\ n(\Delta t2)/Tave\ n(\Delta tbase)) \times UTHn(\Delta tbase) \quad \text{(Formula 3)}$$

$$LTHn(\Delta t3) = (Tave\ n(\Delta t2)/Tave\ n(\Delta tbase)) \times LTHn(\Delta tbase) \quad \text{(Formula 4)}$$

(3) The upper limit threshold value UTHn($\Delta$t3) and the lower limit threshold value LTHn($\Delta$t3) of the next cycle ($\Delta$t3) are calculated based on a traffic volume Tn($\Delta$t1) at the timing (start timing, end timing or the like) of the previous cycle ($\Delta$t1), a traffic volume Tn($\Delta$t2) at the timing (start timing, end timing or the like) of the current cycle ($\Delta$t2), and the upper limit threshold value UTHn($\Delta$t2) and the lower limit threshold value LTHn ($\Delta$t2) of the current cycle ($\Delta$t2) (refer to FIG. 5 for each value). The calculation formula is, for example, the following formula.

$$UTHn(\Delta t3) = (Tn(\Delta t2)/Tn(\Delta t1)) \times UTHn(\Delta t2) \quad \text{(Formula 5)}$$

$$LTHn(\Delta t3) = (Tn(\Delta t2)/Tn(\Delta t1)) \times LTHn(\Delta t2) \quad \text{(Formula 6)}$$

In step S11, since the new upper limit threshold value and the new lower limit threshold value are calculated by the increase or decrease of the average traffic volume or the like in the threshold value update cycle, it is considered that a failure occurs at the time of calculation. That is, there is a possibility that the traffic volume temporarily increases or decreases at that time. Therefore, the threshold value determination unit 128 compares the average traffic volumes in the same time cycle of the same flow of the current day and the previous day (step S12), and determines whether the difference exceeds the predetermined threshold value and is large (step S13). In a case where the difference does not exceed the predetermined threshold value and is not large (step S13; No), the threshold value determination unit 128 determines that no failure has occurred, and adopts the upper limit threshold value UTHn(Δt3) and the lower limit threshold value LTHn(Δt3) obtained in step S11 as the upper limit threshold value and the lower limit threshold value of the next cycle (step 15). In a case where there is a large difference (step S13; Yes), the threshold value determination unit 128 compares the average traffic volume of a short cycle including a threshold value update cycle with the average traffic volume of a long cycle including a plurality of threshold value update cycles, and determines the presence or absence of a failure (step S14). As a result of the comparison, when the difference between both of the traffic volumes is equal to or less than the predetermined value, it is determined that "No failure occurs" (step S14; No), and the processing of step S15 is performed. When the difference between both of the traffic volumes exceeds the predetermined value, it is determined as "There is a possibility of occurrence of abnormality" (step S14; Yes), the upper limit threshold value and the lower limit threshold value are set to the same threshold value as the upper limit threshold value and the lower limit threshold value of the same time cycle of the previous day of the same flow (step S16). Note that, in a case where there is a large difference (step S13; Yes), the threshold value determination unit 128 may execute step S16 without going through step S15.

Although the example in which the calculation is performed for all the flows described in the rule table 29 has been described above, the present invention is not limited thereto, the user may designate some flows, and the upper limit threshold value and the lower limit threshold value may be calculated and updated only for the flows.

By the configuration and method of dynamically changing the upper limit/lower limit threshold values in short cycles, the threshold value according to the actual traffic volume is set, and occurrence of unnecessary capture can be prevented. In addition, as illustrated in Formulas 1 to 6 described above, the threshold value determination unit 128 determines the threshold value based on the degree of variation in the traffic volume based on the traffic volume of a short cycle before the next cycle in which the threshold value is determined, and the threshold value before the next cycle (particularly, the current threshold value), and accordingly, the accuracy of the threshold value can be improved.

In the above description, it is assumed that the average traffic volume of the same time cycle of the previous day is held inside the traffic monitoring device 10. However, depending on the flow, it is assumed that the data does not exist. Therefore, in a case where the long-cycle average traffic volume is observed, the threshold value determination unit 128 may be configured to determine the upper limit threshold value and the lower limit threshold value based on the variation in the long-cycle average traffic volume in consideration of the fact that the influence of the abnormally increased or decreased traffic volume seems to be small.

Figure 7:
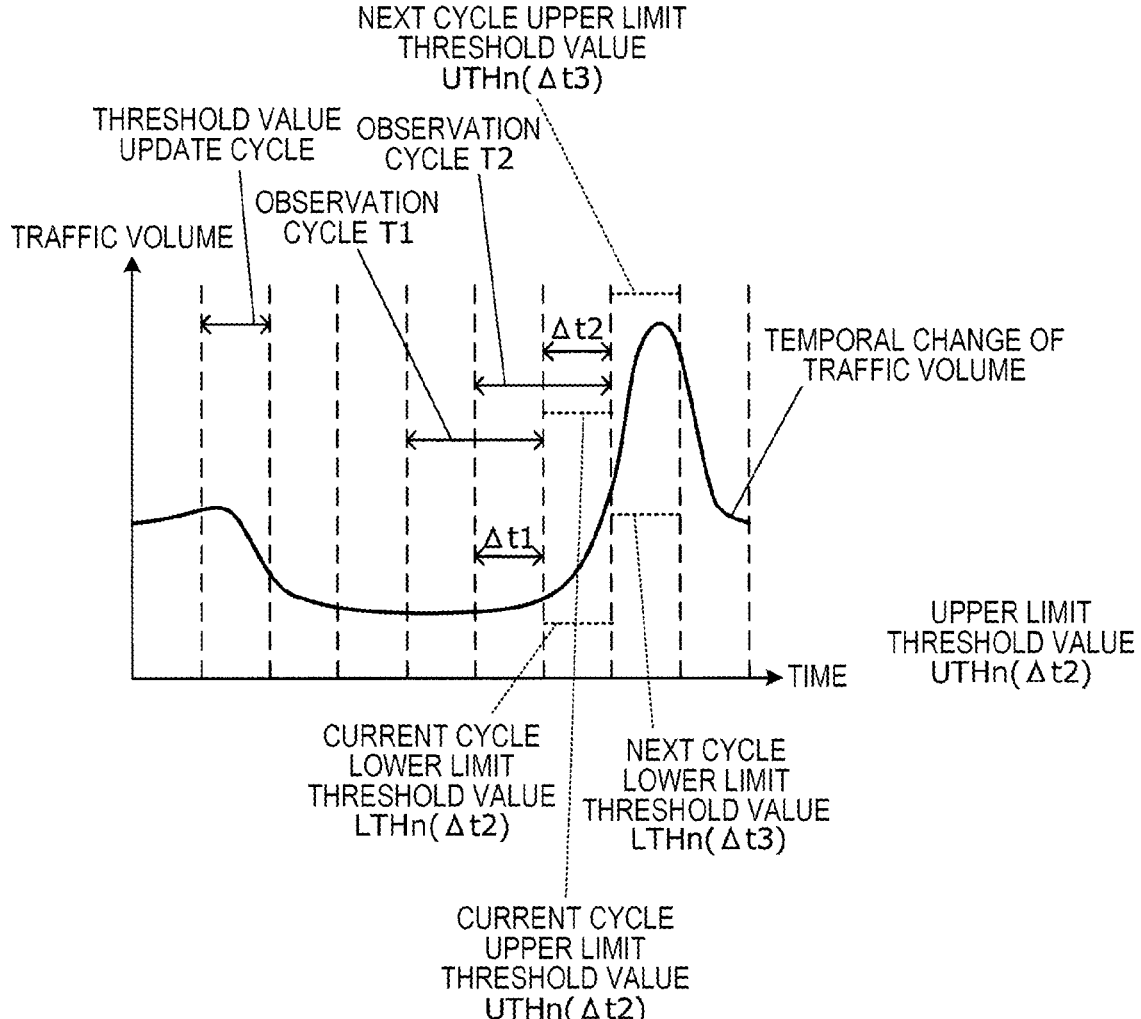
FIG. 7 is a diagram for describing a method of calculating an upper limit threshold value and a lower limit threshold value.

For example, the threshold value determination unit 128 calculates the upper limit threshold value UTHn(Δt3) and the lower limit threshold value LTHn(Δt3) of the next cycle by the following method for each threshold value update cycle (which may be any cycle longer than the short cycle) illustrated in FIG. 7.

For example, the threshold value determination unit 128 calculates the upper limit threshold value UTHn(Δt3) and the lower limit threshold value LTHn(Δt3) based on the average traffic volume Tave n(ΔT2) in an observation cycle T2 (for example, a cycle of one hour or more) including a plurality of consecutive threshold value update cycles and including the current cycle Δt2 as the latest cycle, the average traffic volume Tave n(ΔT1) in an observation cycle T1 (for example, a cycle of one hour or more) including a plurality of consecutive threshold value update cycles and including the previous cycle Δt1 as the latest cycle, and the upper limit threshold value UTHn(Δt2) and the lower limit threshold value LTHn(Δt2) of the current cycle (for example, refer to the following Formulas 7 and 8). The observation cycle T2 and the observation cycle T1 may have the same length.

$$UTHn(\Delta t3) = (Tave\ n(\Delta T2)/Tave\ n(\Delta T1)) \times UTHn(\Delta t2) \quad \text{(Formula 7)}$$

$$LTHn(\Delta t3) = (Tave\ n(\Delta T2)/Tave\ n(\Delta T1)) \times LTHn(\Delta t2) \quad \text{(Formula 8)}$$

For example, as in FIG. 6, the threshold value determination unit 128 calculates the upper limit threshold value UTHn(Δt3) and the lower limit threshold value LTHn(Δt3) based on the average traffic volume Tave n(Δtbase) in the threshold value update cycle which is a reference (or may be a reference observation cycle), the average traffic volume Tave n(ΔT2) in the observation cycle T2 including a plurality of consecutive threshold value update cycles and including the current cycle Δt2 as the latest cycle, and the upper limit threshold value UTHn(Δtbase) and the lower limit threshold value LTHn(Δtbase) in the threshold value update cycle which is the reference (for example, refer to the following Formulas 9 and 10).

$$UTHn(\Delta t3) = (Tave\ n(\Delta 2)/Tave\ n(\Delta Tbase)) \times UTHn(\Delta t2) \quad \text{(Formula 9)}$$

$$LTHn(\Delta t3) = (Tave\ n(\Delta T2)/Tave\ n(\Delta Tbase)) \times LTHn(\Delta t2) \quad \text{(Formula 10)}$$

By calculating the threshold value using the long-cycle traffic volume, it is possible to update the new threshold value while reducing the influence of the presence or absence of the occurrence of the traffic failure. In addition, as illustrated in Formulas 7 to 10 described above, the threshold value determination unit 128 determines the threshold value based on the degree of variation in the traffic volume based on the traffic volume of an observation cycle before the next cycle in which the threshold value is determined, and the threshold value before the next cycle, and accordingly, the accuracy of the threshold value can be improved.

Third Embodiment

Figure 8:
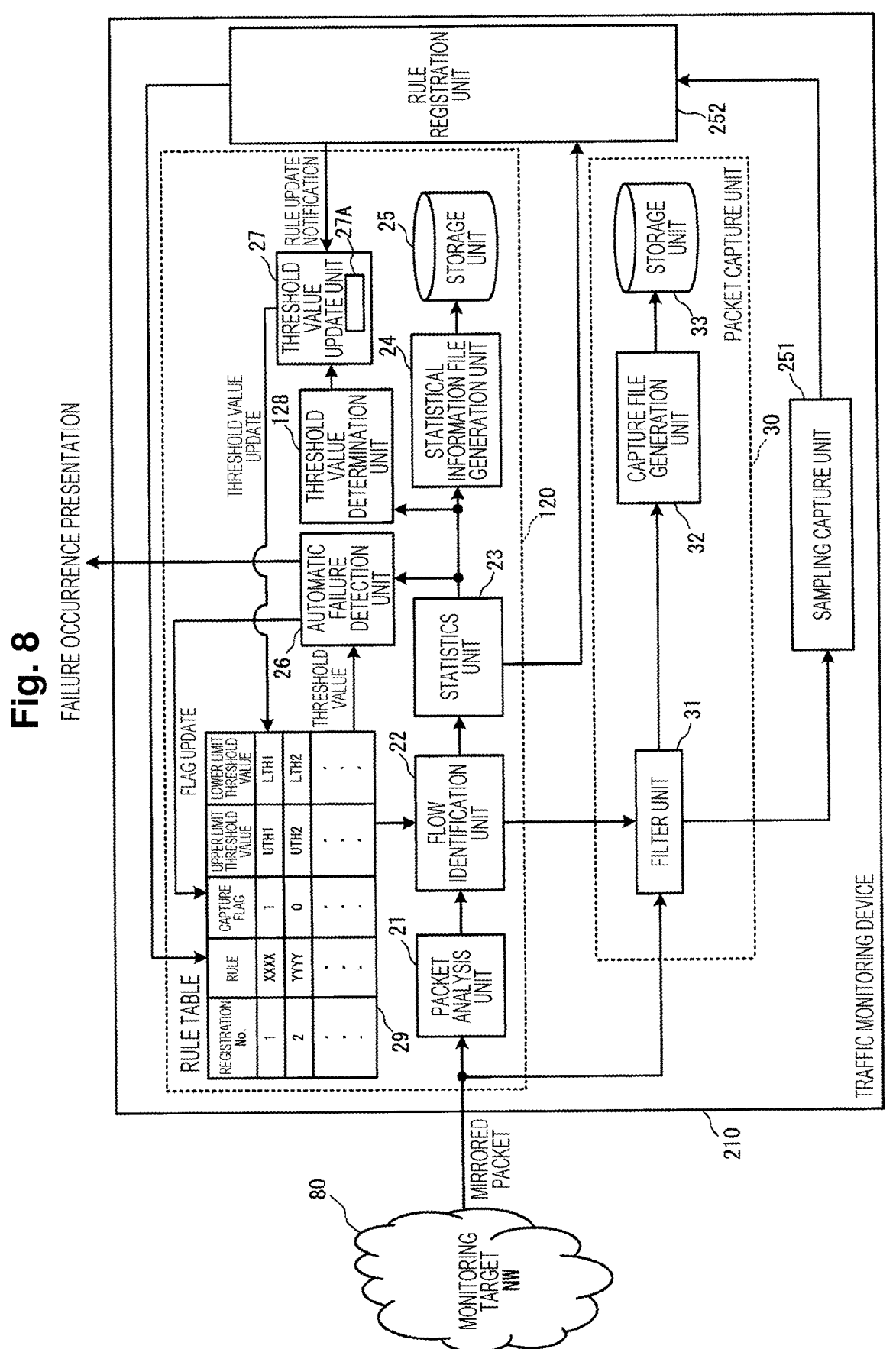
FIG. 8 is a block diagram illustrating a configuration of a traffic monitoring device according to a third embodiment of the present invention.

As illustrated in FIG. 8, the traffic monitoring device 210 according to the third embodiment includes a sampling capture unit 251 and a rule registration unit 252 in addition to the configuration of the traffic monitoring device 110. The traffic monitoring device 210 is configured to register an unregistered flow, which is a flow not registered in the rule table 29, in the rule table 29 together with an upper limit threshold value and a lower limit threshold value.

When there is no rule matching the header information extracted by the packet analysis unit 21, the flow identification unit 22 notifies the filter unit 31 of the fact. Upon receiving this notification, the filter unit 31 outputs the input packet to the sampling capture unit 251.

The sampling capture unit 251 captures packets of the unregistered flow at equal intervals or random intervals in order to specify the distribution of the unregistered flow in a flow unit. The rule registration unit 252 extracts a rule to be registered in the rule table by using the traffic volume of an unregistered rule obtained by subtracting the traffic volume of the registered rule from the total traffic volume output from the statistics unit 23 and the sampling result output from the sampling capture function unit. For example, header information of each packet included in the sampling result (information for specifying a transmission source and transmission destination of packets for specifying a flow) is extracted as the registered rule. The rule registration unit 252 registers the extracted rule in the rule table 29. In response to this, the threshold value update unit 27 registers the initial upper limit threshold value and the initial lower limit threshold value in the rule table 29. These threshold values may be different values for each rule defined in a database or the like included in the threshold value update unit 27, or may be common values regardless of the rule. After the initial threshold value is registered, the upper limit threshold value and the lower limit threshold value are dynamically changed by a method similar to the above flow.

With the above configuration, it is possible to register the rule during the system operation not only for the registration flow but also for the traffic that is the unregistered flow at the time of initial operation of the system, and dynamically update the upper limit threshold value and the lower limit threshold value.

<Hardware Configuration of Traffic Monitoring Device>

The traffic monitoring devices 10, 110, and 210 are realized by various circuits such as a processor that executes a program such as a central processing unit (CPU), a field-programmable gate array (FPGA), or an application specific integrated circuit (ASIC). The information processing unit, the packet capture unit, and the like are also an information processing circuit and a packet capture circuit.

Figure 9:
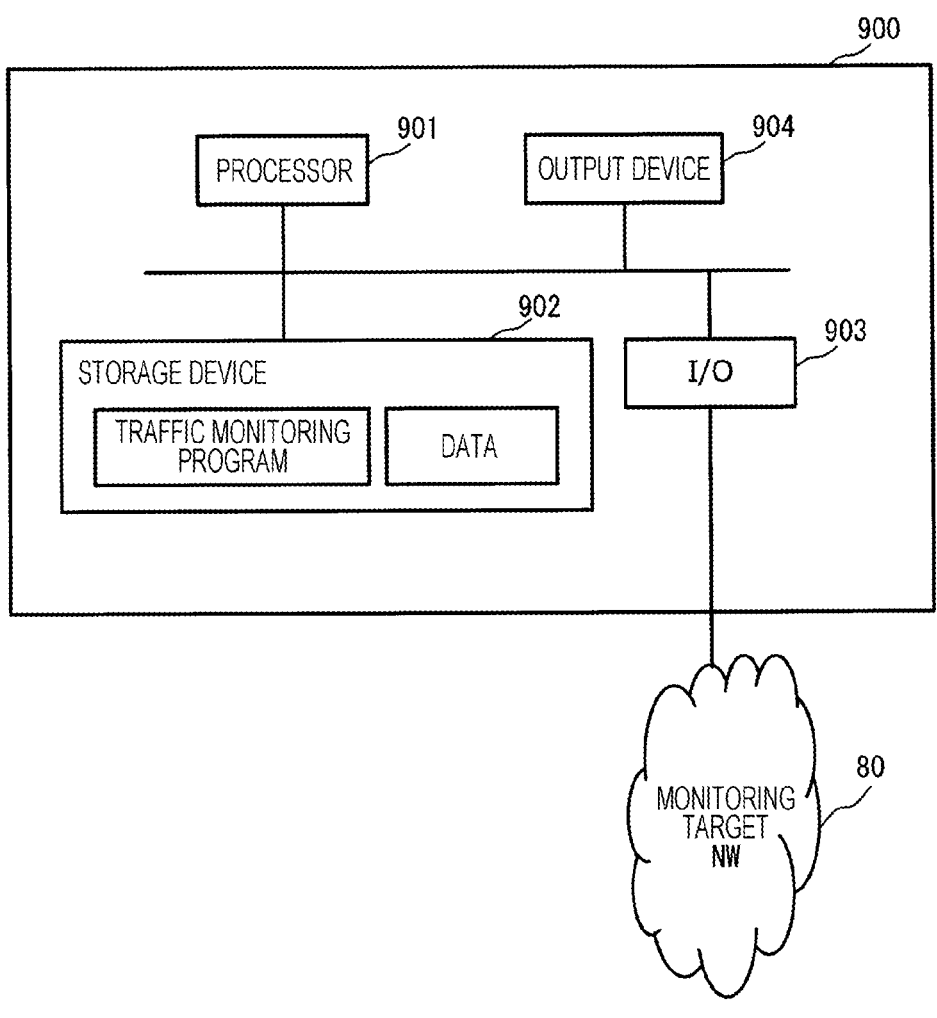
FIG. 9 is a hardware configuration diagram of the traffic monitoring device according to the first to third embodiments of the present invention.

The traffic monitoring devices 10, 110, and 210 may include, for example, a computer 900 illustrated in FIG. 9. The processor 901 includes one or a plurality of CPUs and the like. The processor 901 operates as each of the above units by executing a traffic monitoring program stored in the storage device 902. The storage device 902 may include a main memory of the processor 901 or the like. The storage device 902 stores tables such as the rule table 29, and constitutes the storage unit 25 and the storage unit 33. Each of the above units may have a part of the storage device 902.

When the traffic volume exceeds the upper limit threshold value UTHn or falls below the lower limit threshold value LTHn, the processor 901 that operates as the automatic failure detection unit 26 outputs information indicating these contents (including the contents that a failure has occurred) to the output device 904 and presents the information to the user. Input packets from the monitoring target network 80 is input from an input/output (I/O) 903.

Configuration Exemplifying Above Embodiments

The traffic monitoring device that monitors the traffic of the monitoring target network may include, for example, an information processing unit and a packet capture unit. For example, the information processing unit acquires traffic statistical information of a flow in the monitoring target network, and determines whether the acquired traffic statistical information satisfies a predetermined reference for failure detection. The traffic statistical information is the traffic volume in the above embodiment, but may be other statistical information. Other examples of the traffic statistical information include the number of bytes per unit time, jitter, latency, the number of packets, or the degree of change in the number of bytes (inclination of change in traffic volume, or the like). The predetermined reference to be compared with the degree of change may be set as an upper limit threshold value and a lower limit threshold value for detecting a rapid increase or a rapid decrease in the traffic volume. The packet capture unit captures, for example, a packet of the flow determined to satisfy the predetermined reference as a packet at the time of occurrence of a failure of the flow. The information processing unit dynamically updates the predetermined reference while the information processing unit is in operation. With such a configuration, since the predetermined reference is dynamically changed, packets at the time of failure occurrence are accurately captured. The captured packet is stored in the storage unit and output in response to a request of the user. At this time, the contents of the packets are appropriately displayed on a display unit or the like.

The information processing unit acquires, for example, traffic statistical information of each of the plurality of flows including the flow. The information processing unit updates the capture flag value corresponding to the flow that satisfies the predetermined reference to the first numerical value with reference to a rule table in which a rule that can uniquely specify a flow, a capture flag that takes a first numerical value when the flow is a target of capture by the packet capture unit and takes a second numerical value when the flow is not the target, and the predetermined reference for the flow are associated with each flow. The packet capture unit captures packets of the flow after the capture flag value is changed to the first numerical value. The packet capture unit may buffer a predetermined amount of input packets and capture packets of the flow before and after the input packets are changed to the first numerical value. The rule table facilitates management of the predetermined reference.

The traffic statistical information may be a traffic volume, and the predetermined reference may be an upper limit threshold value and a lower limit threshold value. The information processing unit may determine that the traffic statistical information satisfies the predetermined reference when the traffic volume exceeds the upper limit threshold value or falls below the lower limit value. By providing the lower limit threshold value, it is also possible to detect a failure such as server down. Note that the traffic volume may be the number of packets or the data volume (the number of bytes) per unit time, or may be a degree of change in the number of packets or the data volume.

The information processing unit updates the predetermined reference when a time from a time source reaches a predetermined time. Accordingly, the predetermined reference can be changed with a simple configuration.

Figure 4:
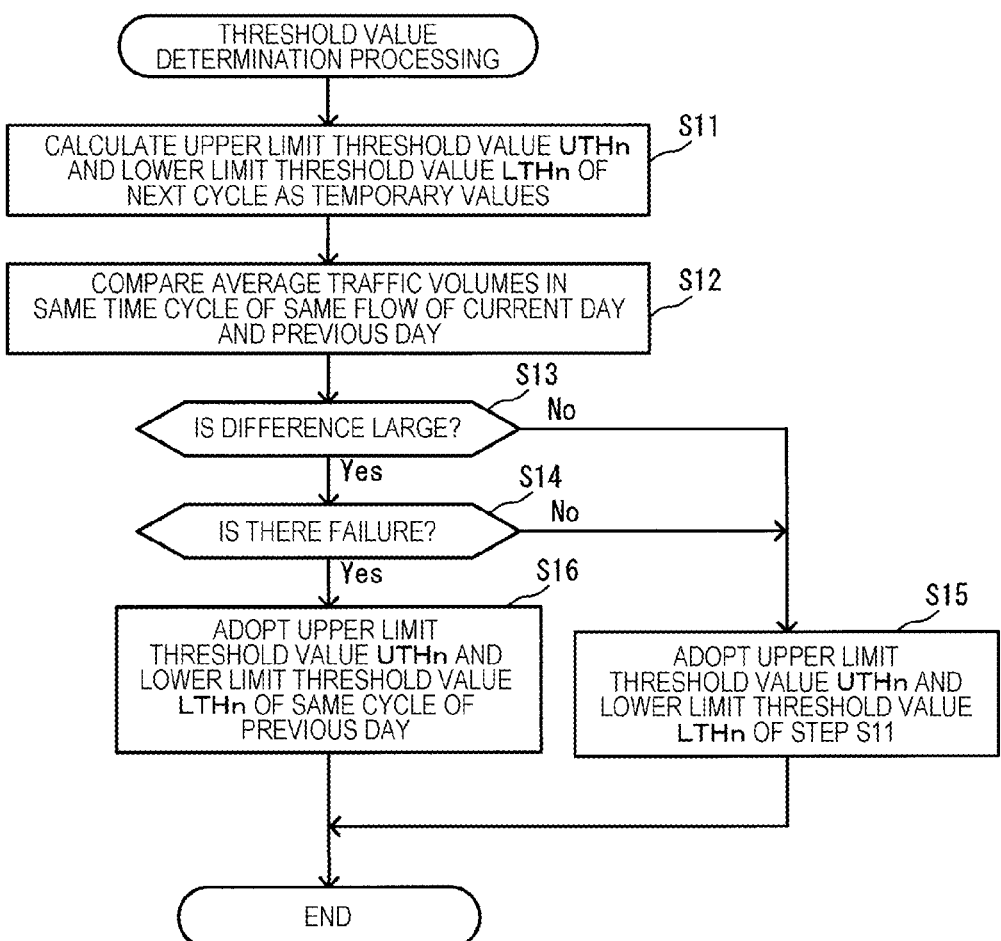
FIG. 4 is a flowchart of threshold value determination processing.

For example, the information processing unit updates the predetermined reference every predetermined cycle, and updates the predetermined reference based on the traffic statistical information before a next predetermined cycle for updating the predetermined reference and the predetermined reference before the next predetermined cycle (for example, the threshold value determination processing of FIG. 4). As a result, the predetermined reference can be suitably updated, and the accuracy of capturing a packet at the time of occurrence of a failure is improved. In particular, as exemplified in Formulas 1 to 10 above, the information processing unit may determine the threshold value based on the degree of variation of the traffic statistical information before the next predetermined cycle for updating the predetermined reference (for example, a ratio between a traffic volume of a certain predetermined cycle and a traffic volume of a previous predetermined cycle), and the threshold value before the next predetermined cycle (for example, the current threshold value). As a result, the predetermined reference can be suitably updated, and the accuracy of capturing a packet at the time of occurrence of a failure is improved.

The traffic statistical information before the next predetermined cycle for updating the predetermined reference may be a traffic volume in a period longer than that of the predetermined cycle. As a result, in a case where the long-cycle traffic volume is observed, even when there is a traffic abnormality at the time of updating the predetermined reference, it is possible to update the predetermined reference with a reduced influence as described above by using the fact that the influence of the traffic volume increased or decreased due to the abnormality seems to be small. In particular, as exemplified in Formulas 7 to 10 above, the information processing unit may determine the threshold value based on the degree of variation in traffic volume (for example, the ratio of the traffic volume in a certain long period to the traffic volume in the preceding specific period) and the threshold value before the next predetermined cycle (for example, the current threshold value), based on the long-period traffic before the next predetermined cycle for updating the predetermined reference. As a result, the pre-determined reference can be suitably updated, and the accuracy of capturing a packet at the time of occurrence of a failure is improved.

The sampling capture unit that captures packets of the unregistered flow at equal intervals or random intervals, and the rule registration unit that registers a rule for specifying a flow included in the captured packet in the rule table may be included. When the rule is registered in the rule table, the information processing unit newly registers a predetermined condition in the rule table in association with the rule. As a result, a flow and a predetermined reference that are not registered in the rule table can be newly registered.

The present invention is not limited to the above-de-scribed embodiments and modification examples. For example, the present invention includes various modifications to the above embodiments and modification examples that can be understood by those skilled in the art within the scope of the technical idea of the present invention. The configurations described in the above embodiments and modification examples can be appropriately combined without inconsistency.

REFERENCE SIGNS LIST

10 Traffic monitoring device
13 Statistics unit
15 Step
16 Automatic failure detection unit
20 Information processing unit
21 Packet analysis unit
22 Flow identification unit
23 Statistics unit
24 Statistical information file generation unit
25 Storage unit
26 Automatic failure detection unit
27 Threshold value update unit
27A Table
29 Rule table
30 Packet capture unit
31 Filter unit
32 Capture file generation unit
33 Storage unit
40 Time source
80 Monitoring target network
110 Traffic monitoring device 120 Information processing unit
128 Threshold value determination unit
210 Traffic monitoring device
251 Sampling capture unit
252 Rule registration unit
900 Computer
901 Processor
902 Storage device
904 Output device

The invention claimed is:

1. A traffic monitoring device, comprising:
one or more processors; and
a storage device storing a program to be executed by the one or more processors, the program including instructions for:
acquiring traffic statistical information of a flow in a monitoring target network;
determining whether the acquired traffic statistical information satisfies a predetermined reference for failure detection;
capturing packets of the flow determined to satisfy the predetermined reference as packets at a time of failure occurrence in the flow;
dynamically updating the predetermined reference while acquiring traffic statistical information of the flow in the monitoring target network;
updating the predetermined reference every predetermined cycle; and
updating the predetermined reference based on the traffic statistical information before a next predetermined cycle for updating the predetermined reference and the predetermined reference before the next predetermined cycle.

2. The traffic monitoring device according to claim 1, wherein the program further includes instructions for:
acquiring traffic statistical information of each of a plurality of flows including the flow;
updating a capture flag value corresponding to the flow satisfying the predetermined reference to a first numerical value with reference to a rule table in which a rule capable of uniquely specifying a flow, a capture flag that takes the first numerical value when the flow is a target of capture and takes a second numerical value when the flow is not the target, and the predetermined reference for the flow are associated with each other for each flow; and
capturing packets of the flow after the capture flag value is changed to the first numerical value or before and after the capture flag value is changed to the first numerical value.

3. The traffic monitoring device according to claim 1, wherein the traffic statistical information is a traffic volume, the predetermined reference is an upper limit threshold value and a lower limit threshold value, and wherein the program further includes instructions for:
determining that the traffic statistical information satisfies the predetermined reference when the traffic volume exceeds the upper limit threshold value or falls below a lower limit value.

4. The traffic monitoring device according to claim 1, wherein the traffic statistical information before a next predetermined cycle for updating the predetermined reference is a traffic volume in a period longer than that of the predetermined cycle.

5. The traffic monitoring device according to claim 1, wherein the program further includes instructions for:

capturing packets of an unregistered flow at equal intervals or random intervals;

registering a rule for specifying a flow included in the captured packets in a rule table; and newly registering a predetermined condition in the rule table in association with the rule when the rule is registered in the rule table.

6. A method for monitoring traffic in a network, comprising:

acquiring, by an information processor, traffic statistical information of a flow in the network;

determining, by the information processor, whether the acquired traffic statistical information satisfies a predetermined reference for failure detection;

capturing, by a packet capturer, packets of the flow determined to satisfy the predetermined reference as packets at a time of occurrence of a failure of the flow;

dynamically updating, by the information processor, the predetermined reference based on time from a time source while the information processor is in operation;

acquiring traffic statistical information of each of a plurality of flows in the network; and updating a capture flag value corresponding to the flow that satisfies the predetermined reference to a first numerical value in a rule table, wherein the rule table associates a rule that can uniquely specify a flow, a capture flag that takes the first numerical value when the flow is a target of capture and takes a second numerical value when the flow is not the target, and the predetermined reference for the flow.

7. The method of claim 6 wherein capturing packets includes capturing packets of the flow after the capture flag value is changed to the first numerical value.

8. The method of claim 7, further comprising:

buffering a predetermined amount of input packets and capturing packets of the flow before and after the input packets are changed to the first numerical value.

9. The method of claim 6, wherein the traffic statistical information is a traffic volume, and the predetermined reference includes an upper limit threshold value and a lower limit threshold value.

10. The method of claim 9, wherein determining whether the traffic statistical information satisfies the predetermined reference includes determining that the traffic volume exceeds the upper limit threshold value or falls below a lower limit value.

11. A method for monitoring traffic in a network, comprising:

acquiring, by an information processor, traffic statistical information of a flow in the network;

determining, by the information processor, whether the acquired traffic statistical information satisfies a predetermined reference for failure detection;

capturing, by a packet capturer, packets of the flow determined to satisfy the predetermined reference as packets at a time of occurrence of a failure of the flow;

updating, by the information processor, the predetermined reference every predetermined cycle while the information processor is in operation; and updating, by the information processor, the predetermined reference based on the traffic statistical information before a next predetermined cycle for updating the predetermined reference and the predetermined reference before the next predetermined cycle.

12. The method of claim 11, wherein the traffic statistical information before the next predetermined cycle for updating the predetermined reference is a traffic volume in a period longer than that of the predetermined cycle.

13. The method of claim 11, wherein updating the predetermined reference based on the traffic statistical information before the next predetermined cycle and the predetermined reference before the next predetermined cycle comprises:

calculating a ratio between traffic statistical information of a current cycle and traffic statistical information of a previous cycle; and multiplying the predetermined reference of the current cycle by the ratio to determine the predetermined reference for the next predetermined cycle.

14. The method of claim 11, wherein the traffic statistical information is a traffic volume, and the predetermined reference includes an upper limit threshold value and a lower limit threshold value.

15. The method of claim 14, wherein determining whether the traffic statistical information satisfies the predetermined reference includes determining that the traffic volume exceeds the upper limit threshold value or falls below the lower limit threshold value.

16. The method of claim 11, further comprising:

acquiring traffic statistical information of each of a plurality of flows in the network, wherein updating the predetermined reference every predetermined cycle includes updating a respective predetermined reference for each of the plurality of flows.

17. The method of claim 11, further comprising:

comparing traffic statistical information of a same time cycle of a same flow from a current day with traffic statistical information of a same time cycle of the same flow from a previous day;

determining whether a difference between the traffic statistical information exceeds a threshold value; and when the difference exceeds the threshold value, setting the predetermined reference for the next predetermined cycle to a same predetermined reference as used for the same time cycle of the previous day.

18. The method of claim 11, wherein the predetermined cycle is between 10 seconds and 10 minutes.

* * * * *